United States Patent [19]

Jablonsky

[11] 4,224,833
[45] Sep. 30, 1980

[54] RACK AND PINION STEERING, ESPECIALLY FOR MOTOR VEHICLES

[75] Inventor: Erich Jablonsky, Boebingen Rems, Fed. Rep. of Germany

[73] Assignee: Zahnradfabrik Friedrichshafen, AG., Friedrichshafen, Fed. Rep. of Germany

[21] Appl. No.: 941,663

[22] Filed: Sep. 12, 1978

[30] Foreign Application Priority Data

Sep. 21, 1977 [DE] Fed. Rep. of Germany ....... 2742427

[51] Int. Cl.³ .............................................. B62D 1/20
[52] U.S. Cl. ....................................... 74/422; 280/96; 308/140
[58] Field of Search ................. 280/95 R, 96; 308/72, 308/140, 194; 74/411, 422

[56] References Cited

U.S. PATENT DOCUMENTS

| 2,703,736 | 3/1955 | Cart | 308/140 |
| 3,433,501 | 3/1969 | Hertel | 280/96 |
| 3,680,443 | 8/1972 | Jenvey | 280/96 X |
| 3,931,875 | 1/1976 | Ladin | 308/140 X |
| 4,045,101 | 8/1977 | Schafer | 308/194 |

FOREIGN PATENT DOCUMENTS 1230684 12/1966 Fed. Rep. of Germany .
2327006 12/1974 Fed. Rep. of Germany .
2540697 11/1975 Fed. Rep. of Germany .
2526487 8/1976 Fed. Rep. of Germany .

Primary Examiner—John J. Love
Assistant Examiner—Michael Mar
Attorney, Agent, or Firm—Zalkind & Shuster

[57] ABSTRACT

The invention provides a steering assembly comprising a gear rack actuated by a pinion shaft rotated by a steering spindle wherein misalignment of the teeth of the gear rack and of the teeth of the pinion shaft can be readily adjusted for the entire flanks of both sides of the teeth so as to eliminate play and maintain constant engagement. A two part housing having relative pivotal motion on a spherical juncture is utilized as a bearing means between the housing members.

10 Claims, 3 Drawing Figures

RACK AND PINION STEERING, ESPECIALLY FOR MOTOR VEHICLES

In general, the invention is intended for steering gear mechanism of power boost systems but is not limited thereto. The construction utilizes a pair of housings which have a juncture on spherical bearing surfaces so as to have universal relative movement. One housing member carries a pinion shaft in permanent coaxial assembly therewith, the end of the pinion shaft being supported in a self-aligning pivotal bearing in the other housing member which carries the gear rack. The pivotal center of the self-aligning bearing is the center of curvature of the spherical juncture. A cam device intermediate the housing members is utilized to effect relative pivotal movement to positions of adjustment to effect alignment of pinion and rack teeth as required.

The prior art, as evidenced in German patents Nos. OS 25 26 487, OS 25 40 697 and OS 23 27 006, provide for a certain amount of misaligning correction but only on one side of the flanks. The present invention, with a relatively small manufacturing expenditure, permits resetting of the pinion shaft and gear rack with aligning of the tooth contact surfaces in all directions to thereby fully correct for all misalignment.

A detailed description of the invention now follows, in conjunction with the appended drawing, in which.

Figures 1, 2:
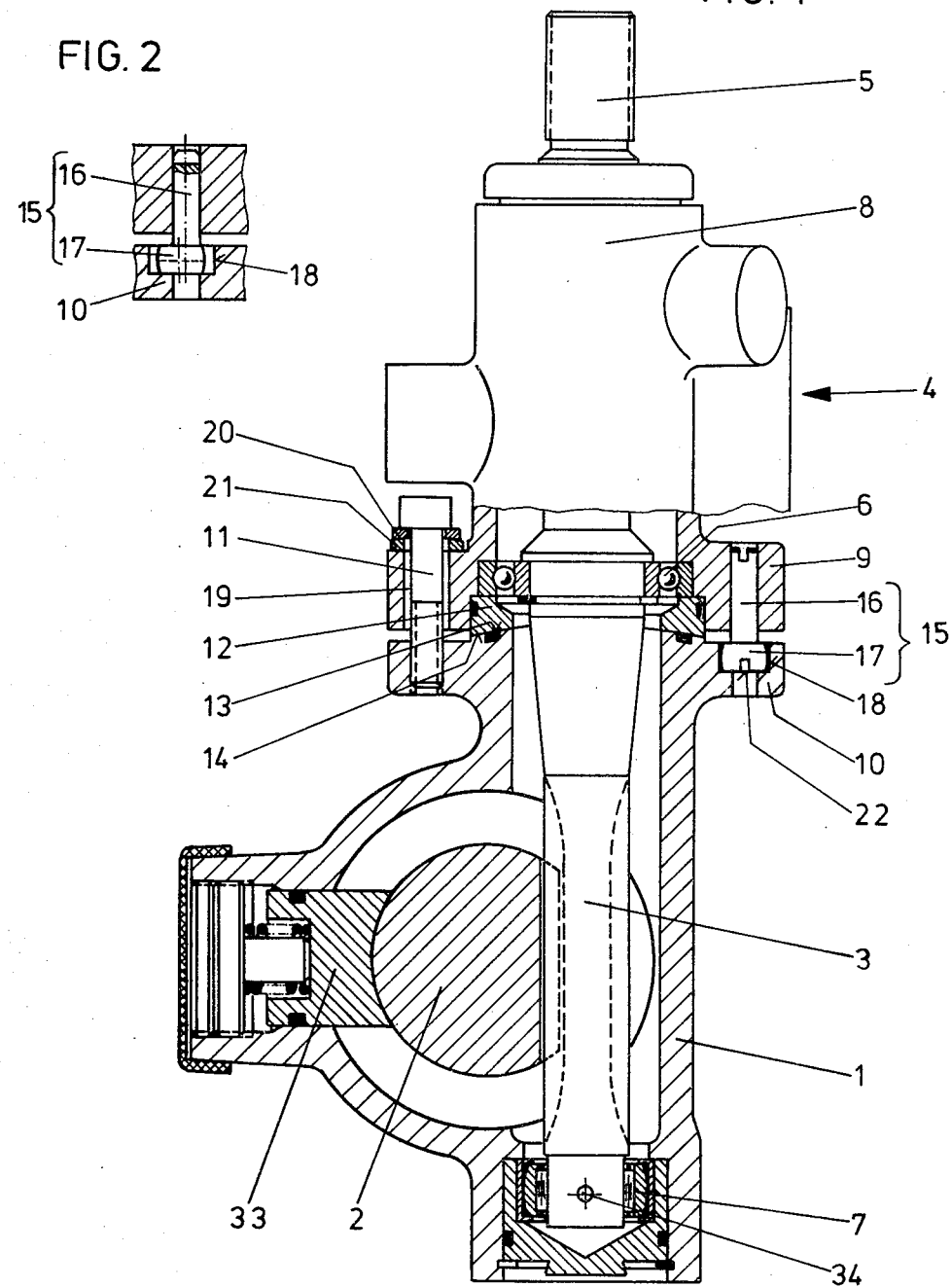
FIG. 1 is a longitudinal view primarily in cross section showing the essential components.
FIG. 2 is an enlarged view of the adjusting mechanism taken at right angles to the view shown in FIG. 1.
Figure 3:
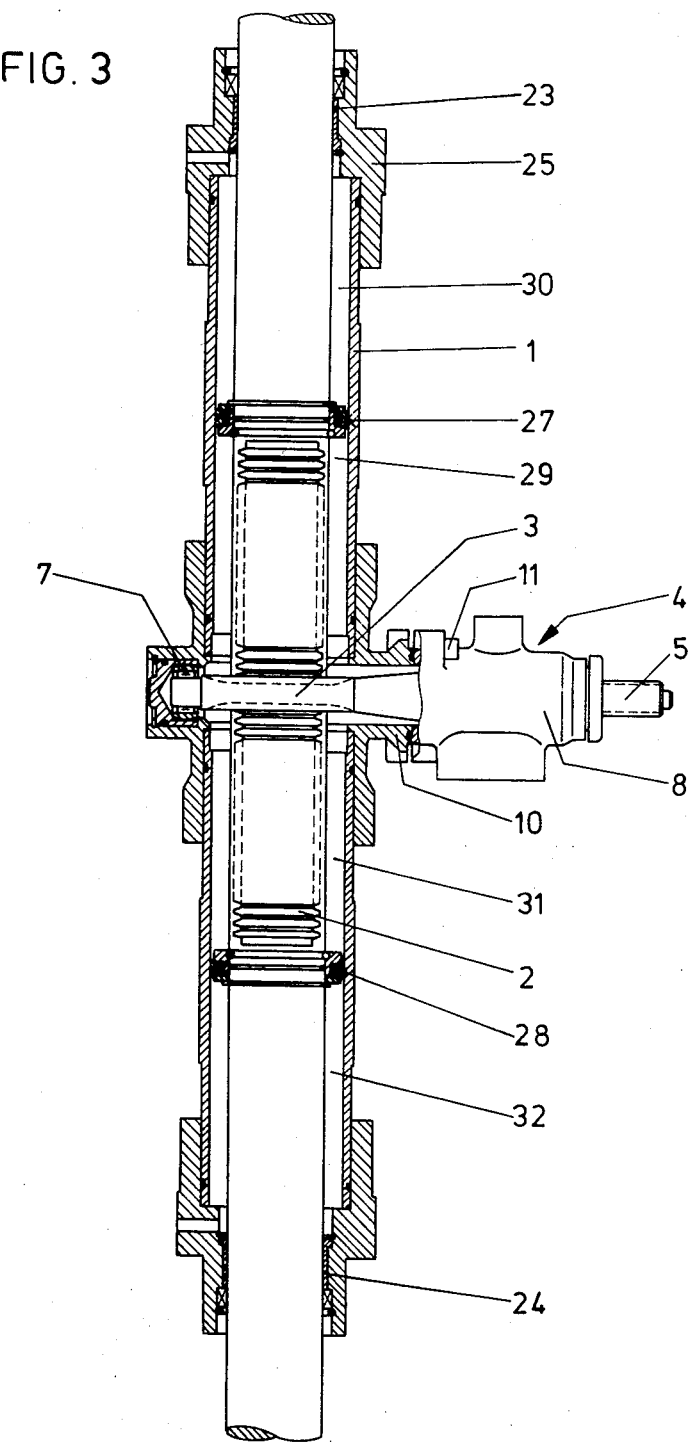
FIG. 3 is a longitudinal view partially in section taken at right angles to the view shown in FIG. 1.

Referring to the drawing, a first housing member 1 is disclosed which carries a circular gear rack 2 mounted so as to be rotative and longitudinally slidable. A pinion shaft 3 is provided with teeth engaging the teeth of the rack in the usual manner and which pinion shaft will be understood to be connected to a control valve 4 within a second housing member 8 for controlling pressure fluid which acts in conjunction with the rack and pinion mechanism to provide booster steering power. The housing members in FIG. 1 are shown as coaxial.

Pinion shaft 3 connects with the steering spindle stub 5 to which, as will be understood, a steering spindle (not shown) is connected to be rotated by a hand steering wheel all in the usual manner so that rotation of the handwheel will, via pinion shaft 3, reciprocate gear rack 2.

Pinion shaft 3 is secured in a fixed bearing 6 carried in housing member 8 so that it will be apparent that the pinion shaft and housing member 8 remain in axial alignment. However, the extremity of pinion shaft 3 is carried in a self-aligning pivotal bearing 7 secured in the housing member 1 wherein the pivotal center of bearing 7 is at the point 34 and, as will be explained subsequently in detail, housing member 8 and thus pinion shaft 3 can rock or pivot about center 34 relative housing member 1.

Housing member 8 has a radial flange 9 while housing member 1 has a radial flange 10. These flanges are connected by one or more screws 11 which fit securely into the flange 10 but have lost motion play in flange 8 in a manner to be described.

Flange 10 is provided with a spherical convex surface 13 matching a complementary concave spherical surface 14 provided in a retainer disc 12 carried in housing member 8 and which secures the fixed bearing 6 therein. The center of the contiguous spherical bearing surfaces is the center 34 of pivotal bearing 7.

From the foregoing it will be apparent that the pinion shaft 3 may swing spherically in any direction about the center 34 with full support on the housing members and that thereby the position of the pinion teeth can be universally adjusted to that of the gear rack teeth so as to adjust for any misalignment. Further, since the gear rack is rotative any angle of misalignment can be corrected.

In order to provide adjustment for relative pivotal adjusting movement between the housing members, the housing member 8 carries a rotative pin or shaft 16 having a cam or eccentric 17 accomodated in an oblong cam recess 18 in the flange 10. The cam is provided with a kerf 22 so that a suitable tool can rotate in it to provide relative pivoting between the housing members and thus between the pinion shaft 3 and the gear rack 2. The axis of pin 16, i.e., the rotary axis of the cam 17 is normal to the axis of the gear rack 2, while the major axis of recess 18 is parallel to the gear rack axis.

In order to permit the pivotal motion, screws 11 pass through oversize bores 19 in flange 9 and have heads which bear on a pair of spherical surfaced washers 20 and 21 supported by the flange 9. Thus it will be apparent that the housing members can pivot, in a geometric sense, on the surface of a sphere whose center is at point 34 without interference from screws 11 which always remain normal to flange 10 but which, of course, would have a relative angled position with respect to flange 9 when the housing members have had relative pivotal movement wherein they are not coaxial.

The gear rack 2 is carried in bearings 23 and 24 which in turn are secured in outer housing extensions 25 and 26. A thrust block 33 is spring biased against gear rack 2 for purposes of guidance and load support.

For steering boost purposes, pressure operated pistons 27 and 28 separate pressure chambers 30 and 32, all disposed coaxially with gear rack 2. Chambers 29 and 31 serve as oil return chambers.

Although the invention is intended for use in power boost systems, as broadly described, it is obvious that it is not thus limited but is useable wherever rack and pinion gearing is utilized, for effecting gear teeth adjustment. Accordingly, the claims are drawn to the adjustment arrangement components and their coaction for the purpose intended.

I claim:

1. In an adjustable rack and pinion steering assembly for motor vehicles, a housing comprised of two joined members (1, 8) and having respective relative pivotal movement surface means (12, 13) engaged therebetween;

a pinion shaft (3) extending between said housing members having an end with a self-aligning pivotal bearing (7) support therefore in one housing member (1) and fixed bearing (6) support in the other housing member; said surface means providing pivotal movement of said housing members about the pivotal center of said self-aligning pivotal bearing;

a rack in said housing engaging said pinion shaft;

and actuating means (15) extending between said housing members for effecting relative pivoting of said housing members for adjustment between teeth on said pinion shaft and teeth on said rack.

2. In a steering assembly as set forth in claim 1, said pivotal surface means being bearing spherical surface means intermediate said housing members; said actuating means comprising a cam (17) having rotative bearing support (16) in one such housing member (14) and having engagement with the other (1) said housing member whereby rotation of said cam effects relative angular movement between said housing members.

3. In a steering assembly as set forth in claim 1, wherein said pivotal movement surface means comprises a spherically shaped surface (13) of a housing member engaging a complementarily spherically surfaced disc (12) carried by a housing member;
   a bearing (6) in the latter housing member and supporting said pinion shaft 3 and said spherically surfaced disc engaging said bearing to secure it.

4. A steering assembly as set forth in claim 1, said housing members being secured by bolts (11) secured in a housing member and passing through enlarged bores of a housing member to provide play for said pivotal movement;
   said bolts having spherically surfaced support discs (20,21) engaging the latter housing member.

5. A steering assembly as set forth in claim 2, wherein the spherical surface means of the housing members permitting pivoting therebetween has a spherical center coinciding with the pivotal center (34) of said pivotal bearing (7).

6. A steering assembly as set forth in claim 2, the rack being of circular cross section and being rotationally mounted.

7. A steering assembly as set forth in claim 6, wherein said cam has a rotative axis normal to the axis of the gear rack and engages the other housing member in an oblong recess having a major axis parallel to the axis of the gear rack.

8. A steering assembly as set forth in claim 7, wherein the oblong recess has a length such that the pinion shaft (3) can adjust in a lateral relation to a position of the gear rack.

9. A steering assembly as set forth in claim 2, including a gear rack in one said housing member engaging said pinion shaft and being of circular cross section and being rotationally mounted; and said cam has a rotative axis normal to the axis of the gear rack and engages the other housing member in an oblong recess having a major axis parallel to the axis of the gear rack; wherein the oblong recess has a length such that the pinion shaft (3) can adjust in a lateral relation to a position of the gear rack.

10. A steering assembly as set forth in claim 2, wherein said pivotal movement surface means comprises a spherically shaped surface (13) of a housing member engaging a complementarily spherically surfaced disc (12) carried by a housing member;
   a bearing (6) in the latter housing member and supporting said pinion shaft 3 and said spherically surfaced disc engaging said bearing to secure it;
   said housing members being secured by bolts (11) secured in a housing member and passing through enlarged bores of a housing member to provide play for said pivotal movement;
   said bolts having spherically surfaced support discs (20,21) engaging the latter housing member.

* * * * *